(12) United States Patent
Cao et al.

(10) Patent No.: US 12,342,306 B2
(45) Date of Patent: Jun. 24, 2025

(54) WIRELESS TIMING ADJUSTMENT FOR PERIODICAL TRAFFIC OF MULTIPLE TIME DOMAINS

(71) Applicant: HUAWEI TECHNOLOGIES CO., LTD., Shenzhen (CN)

(72) Inventors: Hanwen Cao, Munich (DE); Josef Eichinger, Munich (DE)

(73) Assignee: Huawei Technologies Co., Ltd, Shenzhen (CN)

( * ) Notice: Subject to any disclaimer, the term of this patent is extended or adjusted under 35 U.S.C. 154(b) by 232 days.

(21) Appl. No.: 17/981,286

(22) Filed: Nov. 4, 2022

(65) Prior Publication Data

US 2023/0121856 A1    Apr. 20, 2023

Related U.S. Application Data

(63) Continuation of application No. PCT/EP2020/062271, filed on May 4, 2020.

(51) Int. Cl.
*H04W 56/00* (2009.01)
*H04L 5/00* (2006.01)

(52) U.S. Cl.
CPC ..... *H04W 56/005* (2013.01); *H04W 56/0065* (2013.01); *H04L 5/0005* (2013.01)

(58) Field of Classification Search
CPC ........... H04W 56/005; H04W 56/0065; H04W 56/0015; H04W 56/003; H04L 5/0005; H04B 7/269
See application file for complete search history.

(56) References Cited

U.S. PATENT DOCUMENTS

| 8,743,795 B2 | 6/2014 | Yu et al. |
| 9,929,855 B2 | 3/2018 | Ruffini et al. |

(Continued)

FOREIGN PATENT DOCUMENTS

| CN | 1315077 A | 9/2001 |
| CN | 1918940 A | 2/2007 |

(Continued)

OTHER PUBLICATIONS

"3rd Generation Partnership Project; Technical Specification Group Services and System Aspects; Service requirements for cyber-physical control applications in vertical domains; Stage 1(Release 17)," 3GPP TS 22.104 V17.2.0, pp. 1-76, 3rd Generation Partnership Project, Valbonne, France (Dec. 2019).

(Continued)

*Primary Examiner* — Christine Ng
(74) *Attorney, Agent, or Firm* — Leydig, Voit & Mayer, Ltd.

(57) ABSTRACT

A communication terminal is provided for supporting a periodical data flow by forwarding messages received from a communication network to an external node not synchronised with the communication network. The communication terminal is configured to obtain one or more timing adjustment indications from an access node of the communication network and adjust the transmission and/or reception timing of the periodical data flow in dependence on the timing adjustment indication(s). The one or more timing adjustment indications are based on clock mismatch information between the communication terminal and the external node and a holding time.

7 Claims, 9 Drawing Sheets

(56) References Cited

U.S. PATENT DOCUMENTS

| | | | | |
|---|---|---|---|---|
| 2006/0290639 | A1* | 12/2006 | Chen | G09G 3/3611 345/98 |
| 2009/0238120 | A1 | 9/2009 | Cai et al. | |
| 2012/0201221 | A1* | 8/2012 | Mochida | H04L 27/2672 370/329 |
| 2014/0233527 | A1* | 8/2014 | Gehring | H04J 3/06 370/337 |
| 2015/0104886 | A1* | 4/2015 | Weizman | H01L 22/20 257/48 |
| 2015/0145581 | A1* | 5/2015 | Palmer | H03K 5/135 327/262 |
| 2016/0366682 | A1 | 12/2016 | Tseng et al. | |
| 2017/0099636 | A1* | 4/2017 | Arunachalam | H04W 52/0229 |
| 2020/0008127 | A1* | 1/2020 | Ohtsuji | H04W 4/70 |
| 2020/0053678 | A1 | 2/2020 | Moon et al. | |
| 2022/0159547 | A1* | 5/2022 | Ljung | H04W 40/24 |

FOREIGN PATENT DOCUMENTS

| | | |
|---|---|---|
| CN | 101197632 A | 6/2008 |
| CN | 102412954 A | 4/2012 |
| CN | 103001758 A | 3/2013 |
| CN | 2020080100588.1 | 4/2025 |
| EP | 2848082 B1 | 5/2019 |
| WO | 2020067977 A1 | 4/2020 |

OTHER PUBLICATIONS

"3rd Generation Partnership Project; Technical Specification Group Services and System Aspects; Study on enhancements for cyber-physical control applications in vertical domains; Stage 1 (Release 17)," 3GPP TR 22.832 V17.1.0, Total 91 pages, 3rd Generation Partnership Project, Valbonne, France (Dec. 2019).

"3rd Generation Partnership Project; Technical Specification Group Services and System Aspects; System architecture for the 5G System (5GS); Stage 2 (Release 16)," 3GPP TS 23.501 V16.4.0, pp. 1-430, 3rd Generation Partnership Project, Valbonne, France (Mar. 2020).

"3rd Generation Partnership Project; Technical Specification Group Radio Access Network; NR; Multiplexing and channel coding (Release 16)," 3GPP TS 38.212 V16.1.0, pp. 1-146, 3rd Generation Partnership Project, Valbonne, France (Mar. 2020).

"3rd Generation Partnership Project; Technical Specification Group Radio Access Network; NR; Physical layer procedures for data (Release 16)," 3GPP TS 38.214 V16.1.0, pp. 1-151, 3rd Generation Partnership Project, Valbonne, France (Mar. 2020).

"3rd Generation Partnership Project; Technical Specification Group Radio Access Network; NR; Medium Access Control (MAC) protocol specification (Release 16)," 3GPP TS 38.321 V16.0.0, pp. 1-141, 3rd Generation Partnership Project, Valbonne, France (Mar. 2020).

"3rd Generation Partnership Project; Technical Specification Group Radio Access Network; NR; Radio Resource Control (RRC) protocol specification (Release 16)," 3GPP TS 38.331 V16.0.0, pp. 1-835, 3rd Generation Partnership Project, Valbonne, France (Mar. 2020).

"3rd Generation Partnership Project; Technical Specification Group Radio Access Network; Study on NR Industrial Internet of Things (IoT); (Release 16)," 3GPP TR 38.825 V16.0.0, pp. 1-33, 3rd Generation Partnership Project, Valbonne, France (Mar. 2019).

"IEEE Standard for a Precision Clock Synchronization Protocol for Networked Measurement and Control Systems," IEEE Std 1588™-2008 (Revision of IEEE Std 1588-2002), Total 289 pages, Institute of Electrical and Electronics Engineers, New York, New York (Jul. 24, 2008).

"Draft response for LS on SPS/CG for IIoT," 3GPP TSG RAN WG1 Meeting #98, Prague, Czech Republic, R1-1908061, Total 2 pages 3rd Generation Partnership Project, Valbonne, France (Aug. 26-30, 2019).

"LS on SPS/CG for IIoT," 3GPP TSG-RAN WG2#105bis Meeting, Xi'an, China, R2-1905473, Total 2 pages, 3rd Generation Partnership Project, Valbonne, France (Apr. 8-12, 2019).

"5G for Connected Industries and Automation," Second Edition, 5G Alliance for Connected Industries and Automation, White Paper, Total 28 pages (Feb. 2019).

Ericsson, "5G system support for multiple external time domains: option 3," 3GPP TSG-SA WG2 Meeting #131 Santa Cruz-Tenerife, Spain, S2-1901722, total 6 pages, 3rd Generation Partnership Project, Valbonne, France (Feb. 25-Mar. 1, 2019).

Samsung et al., "TSC Burst Arrival Time Usage and Clock Reference," 3GPP TSG-SA WG2 Meeting #133 Reno, US, S2-1906613 (revision of S2-1905662), total 5 pages, 3rd Generation Partnership Project, Valbonne, France (May 13-17, 2019).

* cited by examiner

Figure 3

| Simulation Parameters | |
|---|---|
| GM Clock Mismatch | +/-32 ppm (maximum allowed clock error of TSN device) |
| Transfer Interval | 2 ms |
| Max Delay | Transfer Interval 2ms (according to TS22.104 Table A.2.2.1-1) |
| Slot length | 0.25 ms |
| Tx processing delay | 0.1 ms |
| Rx processing delay | 0.3 ms |
| Time Span | 3 min |

Figure 9

| Simulation Parameters | |
|---|---|
| GM Clock Mismatch | +/-32 ppm |
| Transfer Interval | 2 ms |
| Max Delay | Transfer Interval 2ms (according to TS22.104 Table A.2.2.1-1) |
| Slot length | 0.25 ms |
| Tx processing delay | 0.1 ms |
| Rx processing delay | 0.3 ms |
| Time Span | 3 min |
| High Threshold | 1ms |
| Low Threshold | 0.125ms |

WIRELESS TIMING ADJUSTMENT FOR PERIODICAL TRAFFIC OF MULTIPLE TIME DOMAINS

CROSS-REFERENCE TO RELATED APPLICATIONS

This application is a continuation of International Application No. PCT/EP2020/062271, filed on May 4, 2020, the disclosure of which is hereby incorporated by reference in its entirety.

FIELD

The disclosure relates to timing adjustment in wireless networks.

BACKGROUND

For supporting the Industrial Internet of Things (IIOT), a 5G system needs to support multiple clock domains simultaneously, including a global time domain, a different working clock domain and a Time Sensitive Networking (TSN) clock domain.

Meanwhile, the 5G system should maintain its own clock domain, which shall be kept independent in order to neutrally adapt to different external clock domains. The different clock domains are normally driven by their individual clock masters, which are not synchronized to each other.

As specified in 3GPP TS23.501, the 5G network has an independent 5G Time Domain which is synchronized to its own 5G Grand Master (5G GM) and implements E2E sync among the User Plane Function (UPF) of a core network, a base station such as a gNodeB (gNB) and a user equipment device (UE), as well as the Device-Side TSN Translator (DS-TT) attached to the UE and the Network TSN Translator (NW-TT) attached to the UPF. The NW-TT and DS-TT are also synchronized to the external TSN clock domain for supporting the TSN time-aware system or bridge function. As specified in 3GPP TR 22.832, a gNB needs to serve multiple clock domains.

The challenge is therefore that different clock domains have their independent Grand Master (GM) clocks, and these clocks are not expected to be synchronized.

The data traffic pattern from different working clock domains are driven by their individual GMs and they are unsynchronized. 5G RAN transmission is driven by a 5G GM.

The 3GPP TR 38.825 (FS_NR_IIOT) suggests that in the radio access network (RAN), the Semi-Persistent Scheduling (SPS) for Downlink (DL) and the Configured Grant (CG) in Uplink (UL) are suitable for supporting a periodical deterministic traffic pattern which is common in industrial automation and control applications.

Knowledge of the TSN traffic pattern is useful for the gNB to allow it to more efficiently schedule either via CG/SPS or dynamic grants. In a dynamic grant, UL grant configuration and activation or deactivation of the resources is signaled over a control channel. In CG, UL grant configuration is provided by RRC signaling, and activation or deactivation is provided either by RRC signaling (type 1) or via control channel or physical layer signaling (type 2). Using CG/SPS has an advantage over dynamic scheduling utilization, since it allows for reduction of PDCCH overhead and increased reliability by avoiding control channel blocking. In some references, the CG is also called configured scheduling (CS).

As a result, the timing mismatch problem in RAN arises. The GMS of the 5G clock domain, different working clock domains and the TSN clock domains are unsynchronized, which leads to a timing mismatch between the SPS/CG's scheduling within the 5G system and different traffic patterns from the applications of external clock domains.

For example, there may be two undesirable situations. One situation is illustrated in FIGS. 1(a) and 1(b). When the traffic's transmission interval is larger than the 5G local SPS/CG period, as shown in FIG. 1(a), the delay has large jitter and sometimes the delay exceeds the limit, as shown in FIG. 1(b). A second situation is illustrated in FIGS. 2(a) and 2(b). When the traffic's transmission interval is smaller than the 5G local SPS/CG period, as shown in FIG. 2(a), the delay increases constantly and buffer overflow can occur, as shown in FIG. 2(b). The simulation parameters used are shown in FIG. 3.

It is desirable to develop a method of wireless timing adjustment that can overcome these problems.

SUMMARY

According to a first aspect there is provided a communication terminal for supporting a periodical data flow by forwarding messages received from a communication network to an external node not synchronised with the communication network, the communication terminal being configured to: obtain one or more timing adjustment indications from an access node of the communication network; and adjust the transmission and/or reception timing of the periodical data flow in dependence on the timing adjustment indication(s); wherein the one or more timing adjustment indications is based on clock mismatch information between the communication terminal and the external node and a holding time. This may allow the timing of the periodical data flow to or from the communication terminal to be adjusted to mitigate mismatch between the clocks of different domains.

The communication terminal may be further configured to: estimate the clock mismatch information between the communication terminal and the external node; and provide the estimated clock mismatch information and the holding time to the access node of the communication network. This may allow the clock mismatch information and holding time to be provided to the other components of the communication network.

The communication terminal may be configured to obtain the estimated clock mismatch information from the access node and adjust the egress transmission timing of the periodic data flow so as to mitigate a mismatch between a clock of the communication network and a clock of the external node. This may allow the transmission timing of the data flow from the communication terminal to be adjusted to mitigate mismatch between the clocks of the different domains.

The said estimated clock mismatch information may be based on one or more of: (i) a periodicity with which messages of the periodical data flow are transmitted and/or received by the network according to the frequency of an internal clock of the communication network; and (ii) a ratio of the frequency of a clock of the external node and the frequency of the internal clock of the communication network. These parameters may allow the clock mismatch information to be estimated.

The communication terminal may be configured to quantize the holding time and report the holding time to the access node. This may reduce uplink overhead.

The communication terminal may be a user equipment device and the access node may be a node B. This may allow the communication terminal to be used in a standard communications network.

The periodical data flow may be a semi-persistent scheduling or a configured grant data flow. The communication terminal may be configured to receive the timing adjustment indication in a downlink control message, a physical downlink control channel message or a radio resource control message.

According to a second aspect there is provided a network node for operation in a communication network to support a periodical data flow by forwarding messages received by the network node from and to an external node which is not synchronised with the communication network, the network node being configured to estimate a clock mismatch between an internal clock of the communication network and a clock of the external node, and transmit a message to an access node of the communication network, the message indicating the estimated clock mismatch. This may allow the timing of the periodical data flow to be adjusted to mitigate mismatch between the clocks of different domains.

The estimated clock mismatch may be determined in dependence on one or more of: (i) a periodicity with which messages of the periodical data flow are received by the network according to the frequency of an internal clock of the communication network; and (ii) a ratio of the frequency of a clock of the external node and the frequency of the internal clock of the communication network. These parameters may allow the clock mismatch to be estimated.

The network node may be configured to obtain clock mismatch information between a communication terminal and another external node from the access node, and adjust the egress transmission timing of the periodic data flow so as to mitigate the clock mismatch between the internal clock of the communication network and the clock of the external node. This may allow the transmission timing of the data flow from the network node to be adjusted to mitigate mismatch between the clocks of different domains.

The network node may be part of a core network and the access node of the communication network may be a node B. This may allow the network node to be implemented in a standard communications network.

According to a third aspect there is provided an access node for operation in a communication network to support a periodical data flow by forwarding messages received by the access node from another node of the network to a communication terminal, the access node being configured to receive clock mismatch information; and perform at least one of: (a) transmitting a timing adjustment command to the communication terminal; (b) adjusting the timing of the periodic data flow to the communication terminal in dependence on the clock mismatch information; and (c) transmitting the clock mismatch information to the communication terminal. This may allow the timing of the periodical data flow to be adjusted to mitigate mismatch between the clocks of different domains.

The access node may be configured to transmit the clock mismatch information to the communication terminal in a downlink control message, a radio resource control message or a media access control element. This may conveniently allow the clock mismatch information to be provided to the communication terminal.

The access node may be configured to adjust the timing of the transmission of a subsequent data packet of the periodic data flow and indicate the timing adjustment to the communication terminal. This may be done using, for example, a downlink control indicator. This may allow the timing to be adjusted reactively.

The access node may be configured to determine the number of periods in the future at which the timing of the transmission of a data packet of the periodic data flow should be adjusted and indicate said number of periods to the communication terminal. This may be done using, for example, a radio resource control message. This may allow the timing to be adjusted proactively ahead of time.

The another node may be part of a core network, the access node may be a node B and the communication terminal may be a user equipment. This may allow the access node to be implemented in a standard communications network.

According to a fourth aspect there is provided an access node for operation in a communication network to support a periodical data flow by forwarding messages received by the access node from a communication terminal of the communication network to another node of the communication network, the access node being configured to receive clock mismatch information and a holding time from the communication terminal and being configured to transmit the clock mismatch information to the another node. This may allow the timing of the periodical data flow to be adjusted to mitigate mismatch between the clocks of different domains.

The access node may be configured to transmit the clock mismatch information to the another node of the communication network as assistant information. This may conveniently allow the clock mismatch information to be provided to the another node.

The access node may be a node B, the another node may be part of a core network and the communication terminal may be a user equipment. This may allow the access node to be implemented in a standard communications network.

BRIEF DESCRIPTION OF THE FIGURES

Embodiments of the present disclosure will now be described by way of example with reference to the accompanying drawings.

In the drawings:

FIG. 3 shows the simulation parameters used in FIGS. 1(a) and 1(b) and FIGS. 2(a) and 2(b).

FIG. 9 shows the simulation parameters used in FIGS. 8(a) and 8(b).

DETAILED DESCRIPTION

Described herein is a communication network, which may be a network compatible with 5G network signalling. Each of the nodes and a communication terminal of the network, as well as any nodes external of the network with which the nodes of the network and/or the communication terminal communicate, may comprise a wireless transceiver, a processor and a memory, with two parts for storing code and messages respectively, and a clock. The communication terminal may also comprise a user interface for presenting information or for sensing environmental data. The user interface may comprise a mechanism for communicating or interacting with the device's environment or user, for example a display, touch screen, or one or more transducers. The communication terminal may connect to a plurality of access nodes (such a base station, for example a gNB). Such base stations may also communicate wirelessly with one another. The communication network may comprise at least one communication terminal, at least one access node and at least one network node in the communication network's core network. It is assumed that these components of the communication network are already synchronized.

Figure 1:
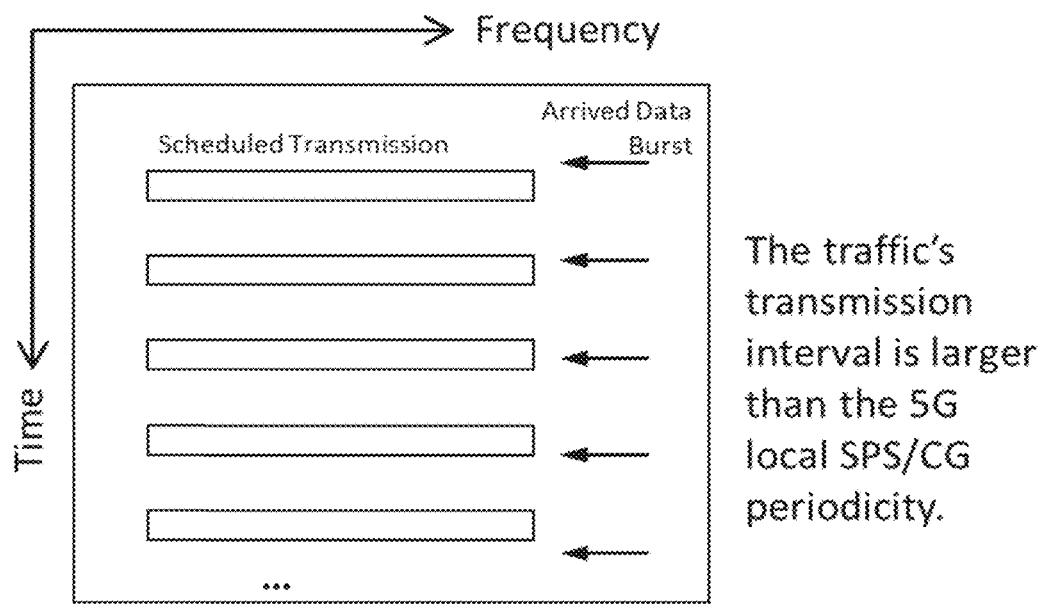
FIG. 1(a) shows a plot of time versus frequency when the data traffic's transmission interval is larger than the 5G local SPS/CG period.
FIG. 1(b) shows a plot of delay versus time when the data traffic's transmission interval is larger than the 5G local SPS/CG period.
Figure 1:
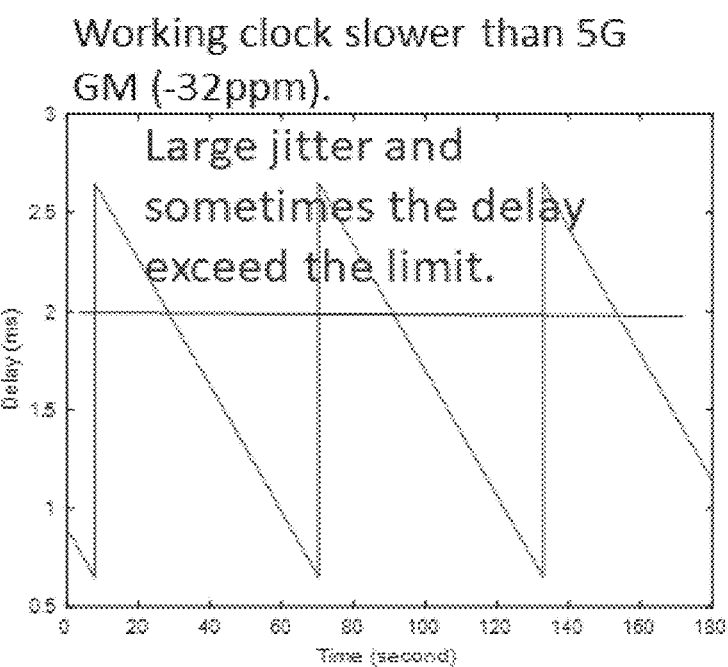
Figure 2:
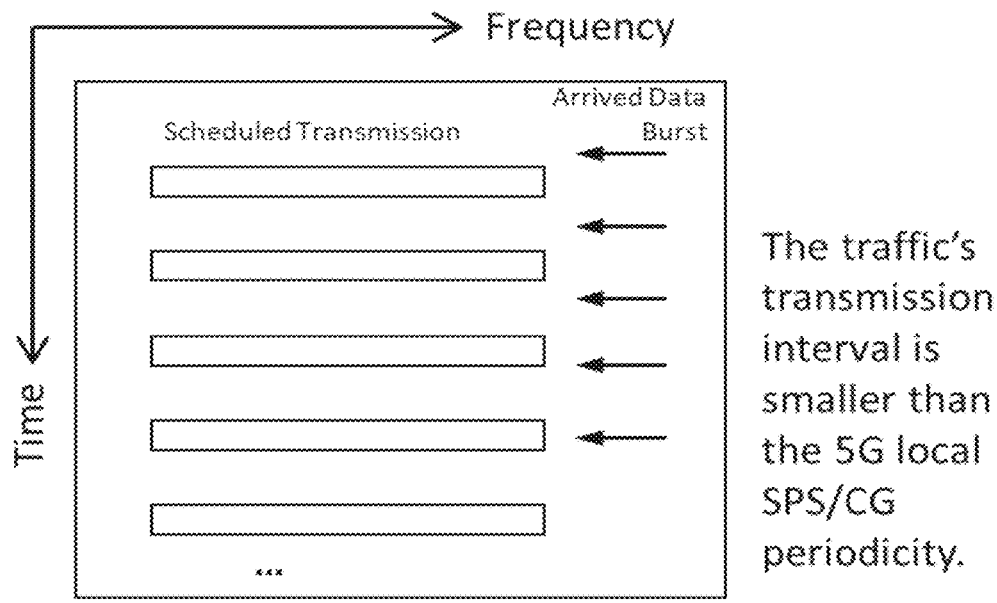
FIG. 2(a) shows a plot of time versus frequency when the data traffic's transmission interval is smaller than the 5G local SPS/CG period.
FIG. 2(b) shows a plot of delay versus time when the data traffic's transmission interval is smaller than the 5G local SPS/CG period.
Figure 2:
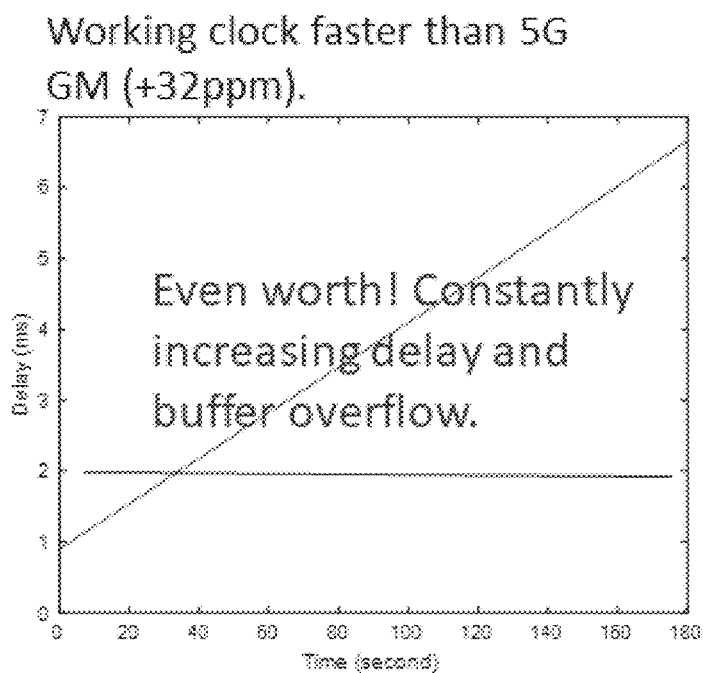
Figure 4:
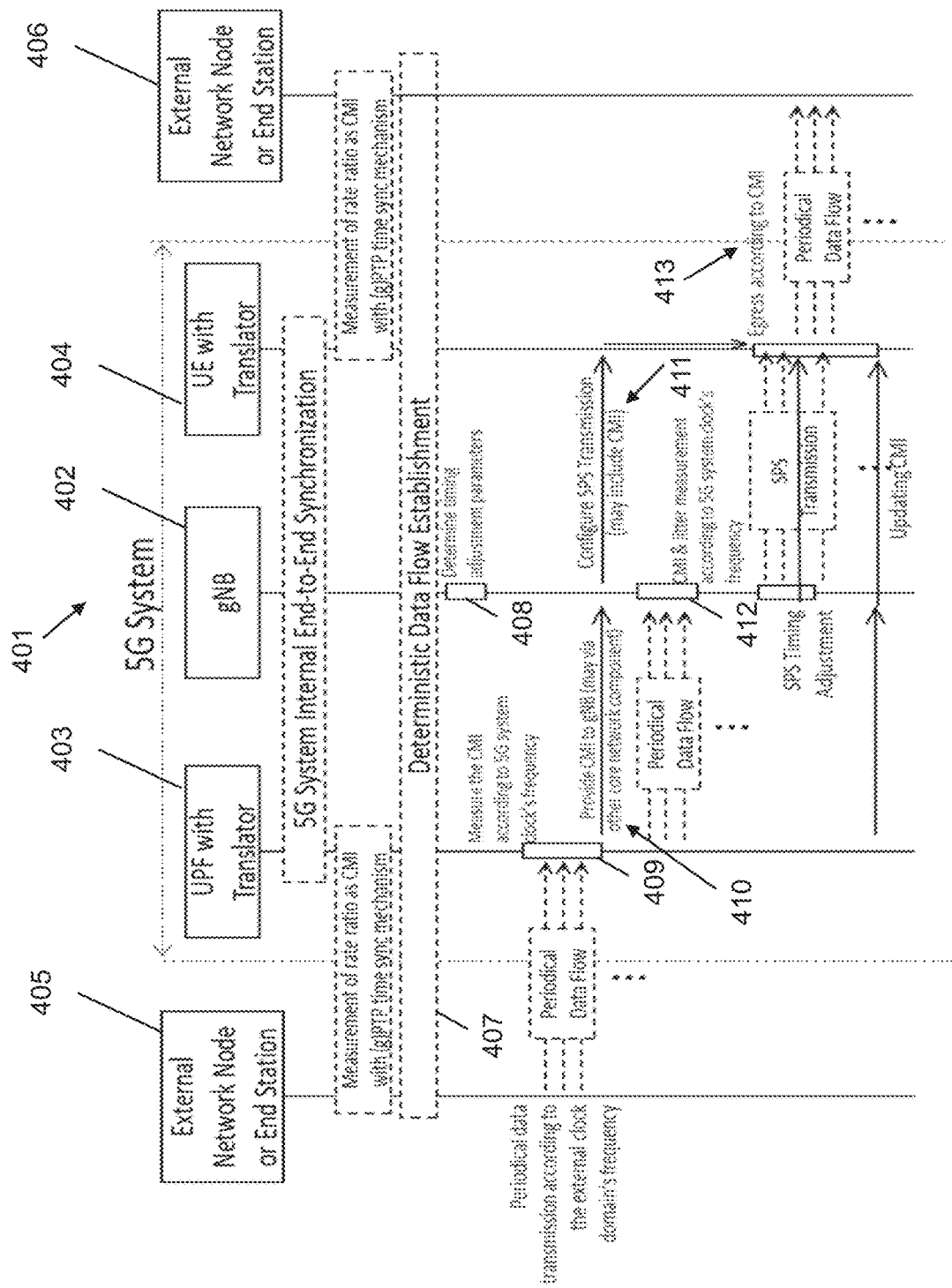
FIG. 4 schematically illustrates downlink SPS timing adjustment based on the clock mismatch measured at the network side in a communication network.

FIG. 4 schematically illustrates downlink (DL) SPS timing adjustment based on the clock mismatch measured at the network side in a communication network. The network comprises a plurality of nodes. The internal communication network components of the 5G system, shown generally at 401, are a gNB 402, a core network, here exemplified as a UPF 403, and a UE device 404. These components are synchronized end-to-end according to the internal 5G system GM clock of the 5G clock domain. Entities 405, 406 are external nodes (i.e. nodes external to the network) or end stations. These external nodes are not synchronised with the communication network. Although reference is made to a 5G system, the principles described in this disclosure are applicable to any network having an architecture compatible to that of a 5G system, in particular with respect to timing adjustment.

As shown in FIG. 4 at 407, the 5G system establishes a deterministic data flow with the transmission interval and delay according to the requirements of the external network or end station 405. For example, 405 may be a TSN network, or a controller, sensor or actuator in industrial automation.

As shown at 408, the gNB 402 is configured to determine the timing adjustment parameters, such as the high/low thresholds (as described below), based on the information of the data flow (for example, the periodicity of the data bursts).

As shown at 409, the core network, which in this example is a UPF 403 with a Translator, particularly a Network-side TSN translator (NW-TT)), makes a measurement of the mismatch between the clock of the 5G system 401 and an external clock of external node 405.

In some implementations, this Clock Mismatch Information (CMI) may be described in one of two forms. Other forms are possible.

In a first exemplary form, the mismatch may be given by the transmission interval or periodicity according to the frequency of the clock of the 5G system 401. For example, assuming an external working clock is 100 ppm (part per million) slower than the 5G system clock, a nominal transmission interval of 1 ms is measured as 1.0001 ms by the 5G system.

In a second exemplary form, the mismatch may be given by the rate ratio, which is the ratio of the external clock domain's frequency (i.e. the domain frequency for a clock of external node 405) and the 5G system clock's frequency. In the aforementioned example, the rate ratio is 0.9999. Apart from directly measuring CMI with the arrival time of a data burst or packet, the CMI (particularly the rate ratio) can be also obtained by UPF 403 and/or UE 404 using existing time synchronization mechanism such as the IEEE 802.1AS or IEEE 1588 (g)PTP mechanism.

As indicated at 410, the measured CMI is provided from the core network 403 to the gNB 402. This may be provided via another core network component, e.g. a Session Management Function (SMF) component. For example, the rate ratio may be added to the Time Sensitive Communication Assistant Information (TSCAI) sent between the UPF 403 and the gNB 402.

The measured CMI can also be provided from the gNB further to the UE, as indicated at 411. This may be done, for example, using three methods. In one method, it may be provided in the RRC signaling configuring the SPS. For example, it may be added into the SPS-Config message. In a second implementation, it may be provided in a new type of RRC signaling which contains the CMI for the data flow. In a third implementation, it may be provided in a new type of Media Access Control (MAC) Control Element (CE).

Both methods can be applied for providing the CMI to the UE device at the SPS establishment phase and continuously providing updates of the CMI to the UE during the runtime of the SPS.

As shown at 412, the gNB 402 also measures the clock mismatch and additionally the jitter of the data flow from the UPF, and can use a hold and forward mechanism for removing the jitter in DL transmission of the Radio Access Network (RAN).

The gNB 402 uses the timing adjustment method (described below) with the knowledge of the holding time (the time elapsed between the arrival of a packet to a gNB or a UE and the transmission of the packet by the gNB or the UE) and the CMI to adjust its downlink SPS transmission's timing. The timing adjustment is commanded by the gNB 402 to the UE 404 in the downlink in the form of DL Control Information (DCI) (described below with reference to FIG. 7), in Physical DL Control Channel (PDCCH) or Radio Resource Control (RRC) signaling (described below with reference to FIG. 8).

As indicated at 413, the UE 404 uses the obtained clock mismatch information with rate ratio and/or transmission interval/periodicity from the gNB 402 to adjust the timing of the egression of the data traffic to the external network or end station 406 with the hold and forward mechanism described herein.

Figure 5:
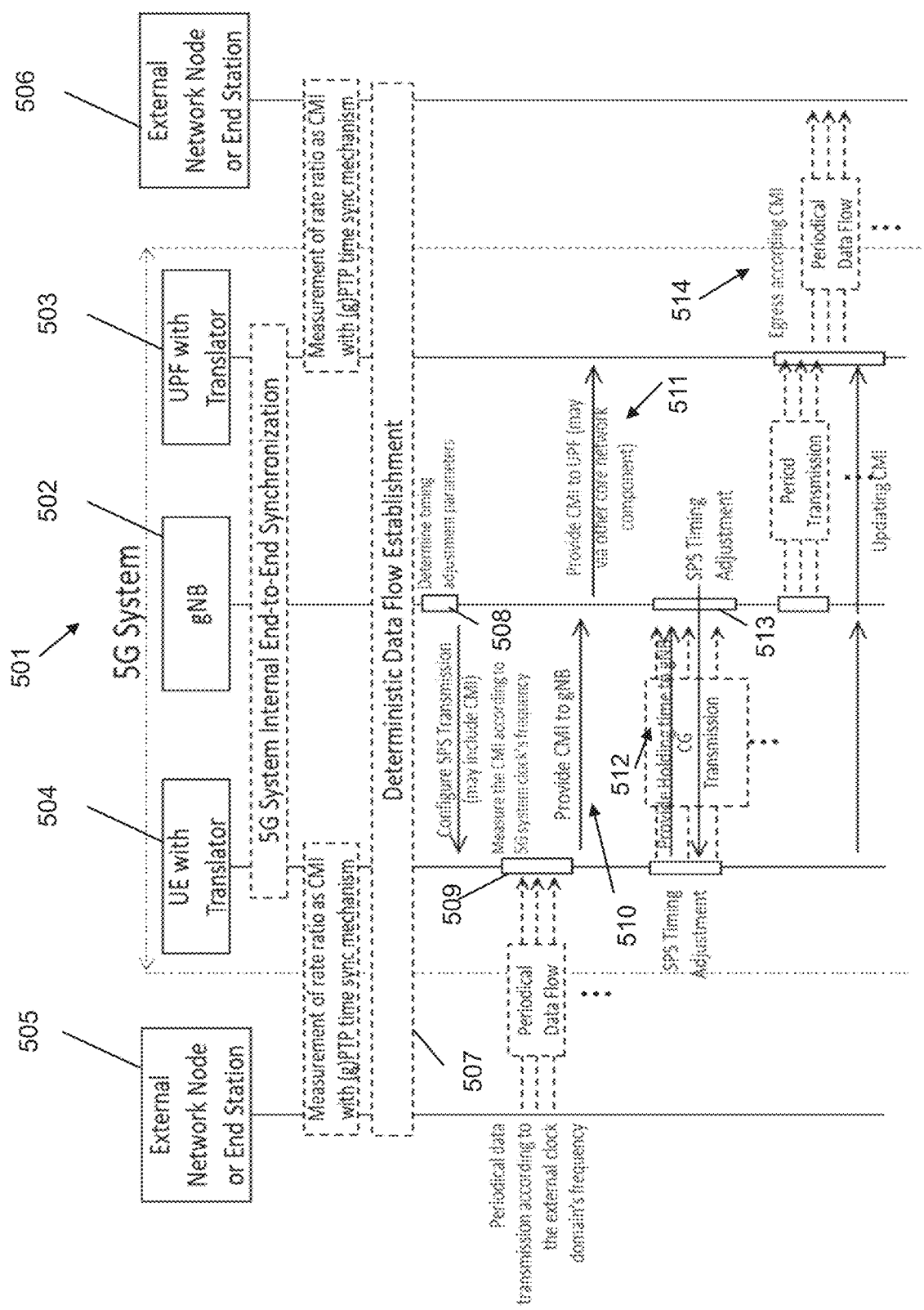
FIG. 5 schematically illustrates uplink CG timing adjustment in a communication network.

FIG. 5 schematically illustrates uplink (UL) CG Timing Adjustment based on the CMI, such as the transmission interval or rate ratio, measured at the UE device side of the network.

The internal network components of the 5G system, shown generally at 501, are the gNB 502, core network, illustrated here as a UPF 503, and a UE device 504. These components are synchronized end-to-end according to an internal 5G system GM clock of the 5G clock domain. Entities 505, 506 are external nodes (i.e. nodes external to the network) or end stations. These external nodes are not synchronised with the communication network.

As shown in FIG. 5 at 507, the 5G system establishes a deterministic data flow with the transmission interval and delay according to the requirements of the external network or end station 506.

The 5G system 501 establishes a deterministic data flow in UL with the transmission interval and delay according to the requirements of external network (for example, TSN network) or end station (e.g. controller, sensor or actuator in industrial automation).

As indicated at 508, gNB 502 determines the timing adjustment parameters such as the high/low thresholds (described in timing adjustment mechanism below) based on the information of the data flow (e.g. the periodicity of data burst).

As shown at 509, the UE 504 (preferably with a Translator, particularly a Device-side TSN translator (DS-TT)) makes the measurement of the mismatch between the 5G system clock and the external clock. Similarly to that described with reference to FIG. 4, this CMI may have one of two forms. In one form, the CMI is the transmission interval/periodicity according to the 5G system clock's frequency. In another form, the CMI is a rate ratio, which is the ratio of the external clock domain's frequency and the 5G system clock's frequency.

Aside from directly measuring the CMI with the arrival time of a data burst, the CMI (particularly the rate ratio) can be also obtained by the UPF and/or the UE device using existing time synchronization mechanisms, such as the IEEE 802.1AS or IEEE 1588 (g)PTP mechanism.

As shown at 510, the measured CMI is provided from the UE 504 to the gNB 502, for example with the MAC Control Element (CE)).

As shown at 511, the measured CMI can be further provided from the gNB 502 to the core network (UPF 503). This may be provided via another core network component, such as a Session Management Function (SMF) component. For example, it may be provided in the Time Sensitive Communication Assistant Information (TSCAI)).

As shown at 512, the holding time (described below for the timing adjustment mechanism) of a data burst at the UE device 504 is provided by the UE to the gNB 502 (for example, with the MAC CE). The holding time can be attached to data burst (e.g. to the PDCP SDU). Alternatively, the holding time can be contained in the MAC CE (similar to Buffer Status Report (BSR)). Alternatively, a new dedicated MAC CE can be defined for reporting the holding time.

The holding time can be quantized for reducing UL overhead, for example:

$$\frac{SPS \text{ or } CG \text{ Periodicity}}{2^N}$$

where N is the number of bits. For example, 4 bits can denote the holding time with the resolution 1/16 periodicity.

As shown at 513, the gNB uses the timing adjustment method (described below) with the knowledge of the holding time and the CMI (both provided by the UE device) to adjust its UL CG transmission's timing.

In one example, the timing adjustment is commanded by the gNB to the UE in DL in the form of DL Control Information (DCI) in Physical DL Control Channel (PDCCH) or Radio Resource Control (RRC) signaling, as will be described in more detail later.

As shown at 514, the UE uses the obtained CMI (i.e. the transmission interval/periodicity or rate ratio) from the gNB 502 to adjust the timing of the egression of the data traffic to the external network or end station 506 with the hold and forward mechanism described below.

A basic mechanism for timing adjustment (as referred to above) will now be described.

This mechanism is used by the gNB network node to determine at least one timing adjustment indication. The parameters used in the description of this mechanism are outlined below:

n is the index of CG/SPS transmission.

$T_{Tx}(n)$ is the scheduled transmission time before timing adjustment according to CG/SPS schedule of the data burst n.

$T_{Tx}'(n)$ is the scheduled transmission time after timing adjustment.

$T_{Arrival}(n)$ is the moment when the data burst n arrives at the UE or gNB.

$\tau_{TxHold}(n) = T_{Tx}(n) - T_{Arrival}(n)$ is the holding time of data burst n, which is the time elapsed between the arrival of a packet to a gNB or a UE and the transmission of the packet by the gNB or the UE. The range of this should be within the range limited by a high threshold and a low threshold $[T_{thrLow}, T_{thrHigh}]$.

$\tau_{adj}(n)$ is the timing adjustment factor which is determined by gNB considering the signaling time, time slot/frame boundary and satisfying the condition:

$$T_{Tx}(n) - \tau_{adj}(n) > T_{Arrival}(n)$$

Two exemplary ways of arranging timing adjustment will now be described.

In one approach, a reactive approach may be used. In this approach, based on the current holding time, the scheduler can decide whether to perform timing adjustment immediately or not.

Adjusting the next transmission time based on current holding time is performed according to the following:

$$\tau_{TxHold}(n) = T_{Tx}(n) - T_{Arrival}(n)$$
$$\text{IF } T_{Tx}(n) - T_{Arrival}(n) > T_{thrHigh}$$
$$T_{Tx}'(n) = T_{Tx}(n) - \tau_{adj}(n)$$
$$\text{ELSEIF } T_{Tx}(n) - T_{Arrival}(n) < T_{thrLow}$$
$$T_{Tx}'(n) = T_{Tx}(n) + \tau_{adj}(n)$$
$$\text{END}$$

The active adjustment can be carried out by using DCI format 0_0, 0_1, 1_0, 1_1 scrambled by CS-RNTI or new type of DCI format to override the current CG/SPS. The new type of DCI format should contain at least the information of time domain resource assignment.

Figure 6:
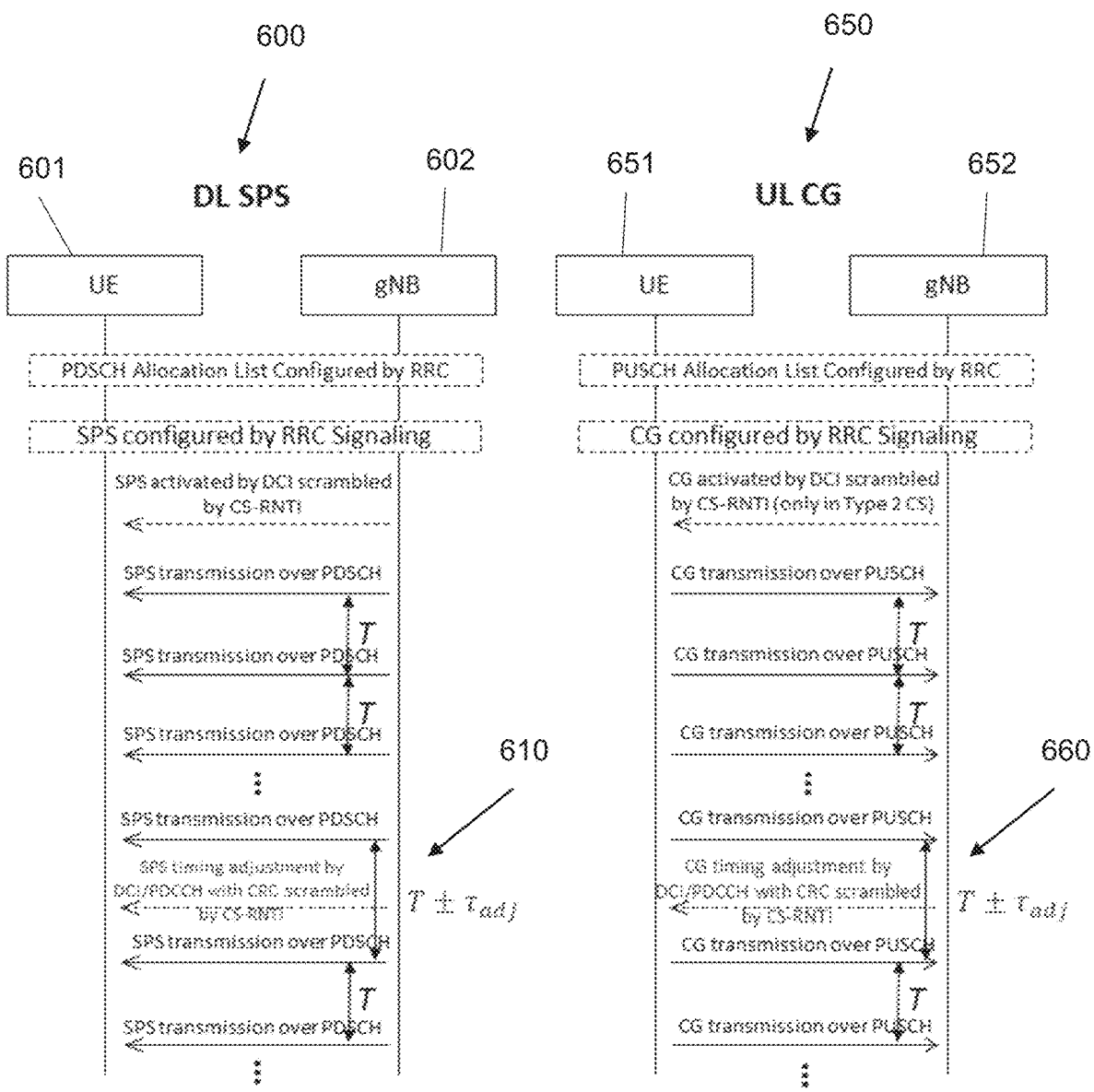
FIG. 6 schematically illustrates an example of reactive SPS/CG timing adjustment with PDCCH.

DCI format 0_0, 0_1, 1_0, 1_1 contains the "Time domain resource assignment" field carrying the row index of the items in pusch_allocationList or pdsch_allocationList in RRC The solution using reactive timing adjustment is described below and is illustrated in FIG. 6. Specifically, FIG. 6 shows an example of reactive SPS/CG Timing Adjustment with PDCCH. The flow for downlink SPS is shown at 600, between a UE 601 and a gNB 602. The flow for uplink CG is shown at 650, between a UE 651 and a gNB 652.

The timing of SPS/CG can be adjusted reactively using PDCCH, for example using DCI in PDCCH scrambled by CS-RNTI for timing adjustment that advances or postpones the next SPS/CG transmission. Some exemplary options for achieving this are:

Option a: Using existing DCI Format (e.g. 0_0 & 0_1 (UL CS) and 1_0 & 1_1 (DL SPS)) with adjusted "Time domain resource assignment" field. Other existing parameters in the DCI format (e.g. Frequency domain resource assignment, MCS) can be also adjusted.

Option b: Using a new DCI format which contains at least the "Time domain resource assignment" field or a dedicated timing adjustment field adjust the timing of SPS/CG transmission.

Before the timing adjustment (advancement or postponement by $\tau_{adj}$) takes effect, as indicated at 610 and 660 in FIG. 6, the current SPS/CG may continue with the same period T.

The timing adjustment DCI can be scrambled to the CS-RNTI which identifies the SPS or CG.

The "Time domain resource assignment" field carries the row index of the items in pusch_allocationList or pdsch_allocationList in RRC:

a. K0 (for DL) and k2 (for UL) values specify the slot offset relative to current PDCCH.

b. startSymbolAndLength specify the starting symbol within the slot and length (SLIV).

In another approach, a proactive timing adjustment method may be used.

In the proactive approach, Δn is the number of CG/SPS periods in the future when the timing adjustment should take place.

The scheduler predicts the n in the future, based on current holding time, measured transmission interval or rate ratio, and SPS/CG period:

$$\Delta n = \begin{cases} \left\lfloor \frac{\tau_{T \times Hold} - T_{thrLow}}{(1-R)P} \right\rfloor, \text{ when } R < 1 \\ \left\lfloor \frac{T_{thrHigh} - \tau_{T \times Hold}}{(R-1)P} \right\rfloor, \text{ when } R > 1 \end{cases}$$

where R is the rate ratio.

The proactive timing adjustment can performed using existing RRC signaling for configuring CG/SPS (e.g. SPS-Config for DL SPS and ConfiguredGrantConfig for UL CG) or a new type of RRC signaling.

Figure 7:
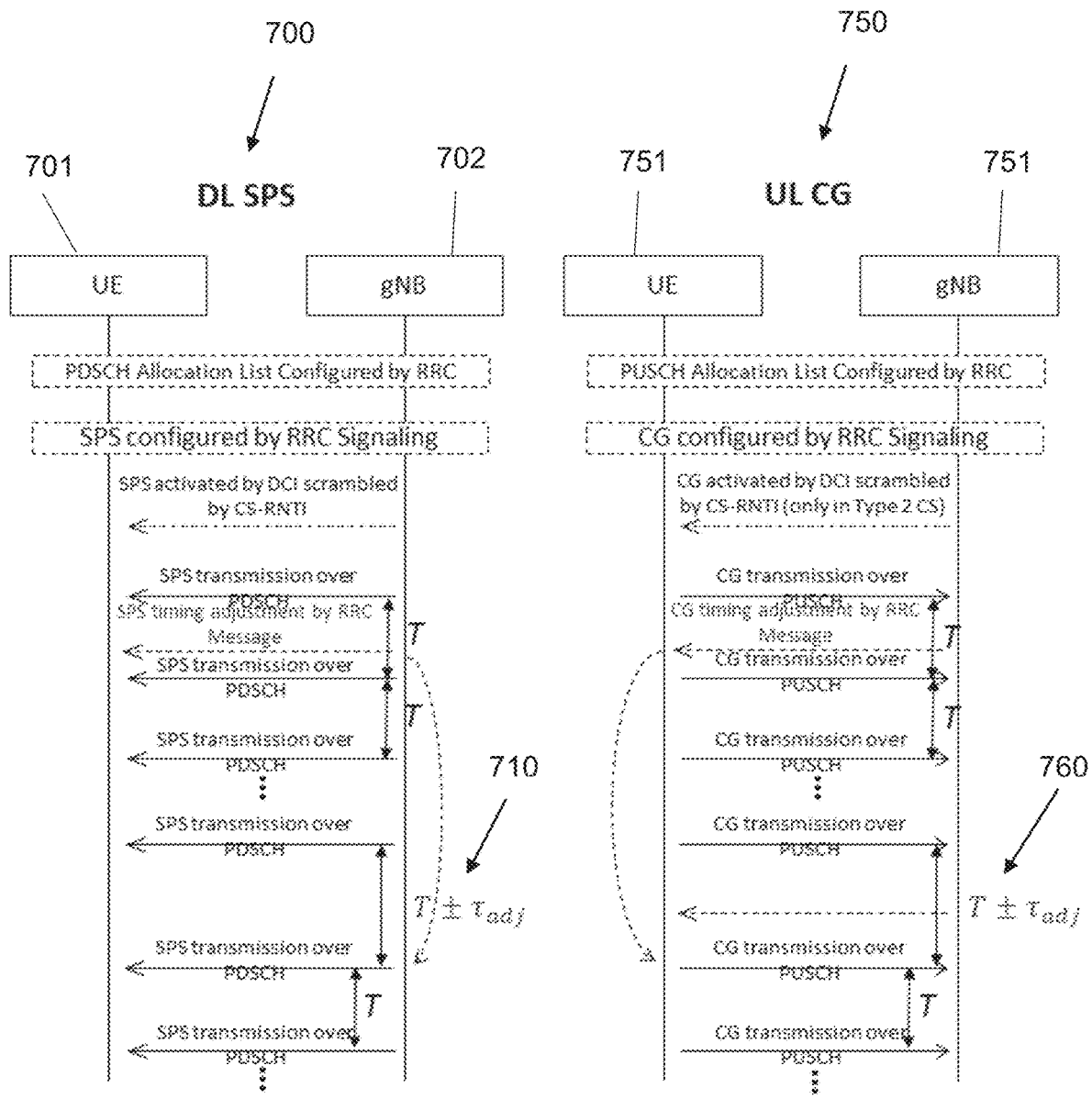
FIG. 7 schematically illustrates an example of proactive SPS/CG timing adjustment with RRC Signaling.

The solution using proactive timing adjustment is described below and illustrated in FIG. 7. Specifically, FIG. 7 shows an example of Proactive SPS/CG Timing Adjustment with RRC Signaling. The flow for downlink SPS is shown at 700, between a UE 701 and a gNB 702. The flow for uplink CG is shown at 750, between a UE 751 and a gNB 752.

As described below, the timing of SPS/CG can be adjusted proactively by RRC signaling ahead of time.

In one example, this can be done using existing RRC signaling for configuring CG/SPS. For example, SPS-Config for DL SPS and ConfiguredGrantConfig for UL CG. In another example, this can be done using a new type of RRC Message which may contain:

timeDomainAllocation: Indicates a combination of start symbol and length and PUSCH mapping type, see TS 38.214 [19], clause 6.1.2 and TS 38.212 [17], clause 7.3.1.

timeDomainOffset: Offset related to SFN=0, see TS 38.321 [3], clause 5.8.2.

for DL SPS transmission, the CMI (transmission interval/periodicity according to 5G system clock or rate ratio) can be also included Before the timing adjustment (i.e. the advancement or postponement by $\tau_{adj}$) takes effect, as indicated at 710 and 760 in FIG. 7, the current SPS/CG may continue with the same period T.

Figure 8:
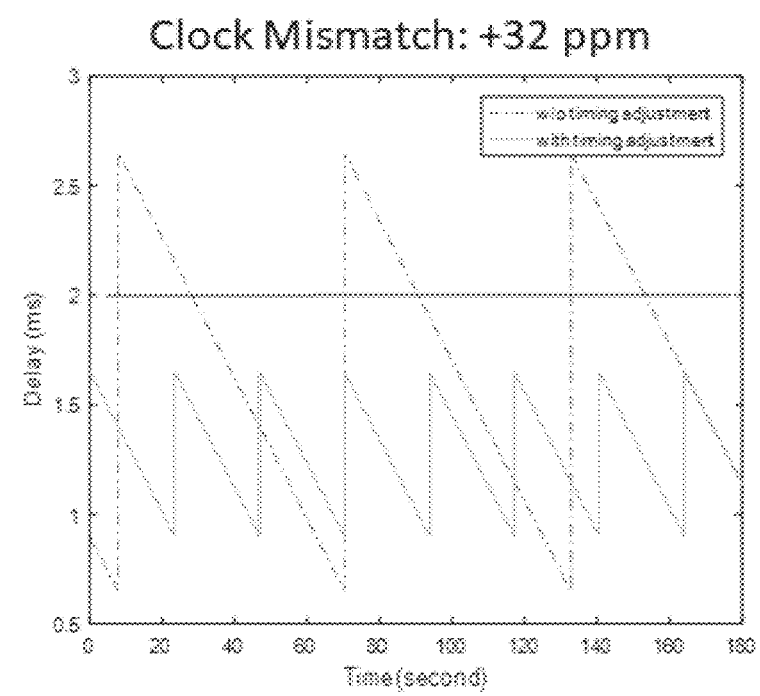
FIGS. 8(a) and 8(b) illustrate the effectiveness of timing adjustment for mitigating the clock mismatch problem.
Figure 8:
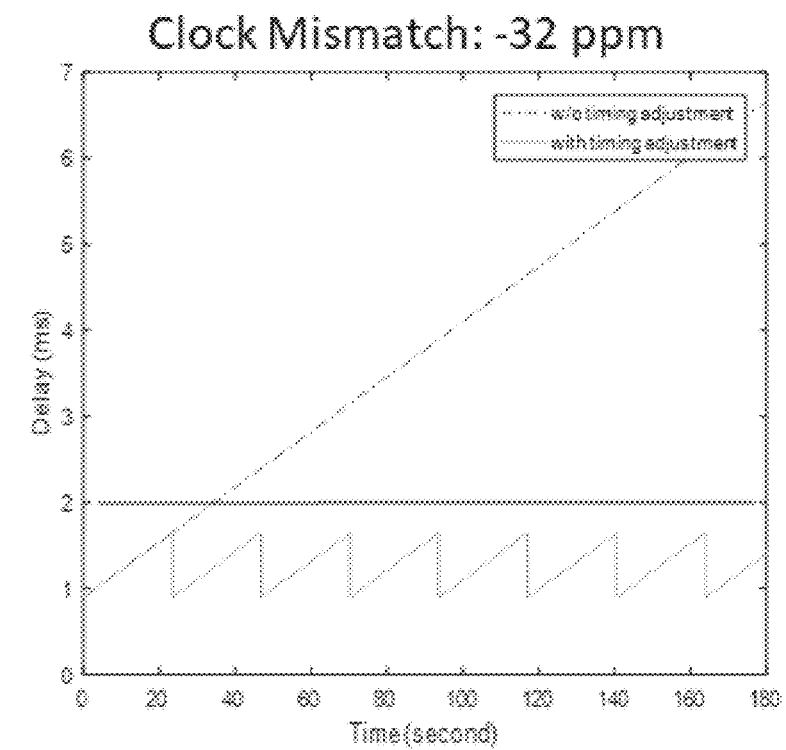

FIGS. 8(*a*) and 8(*b*) illustrate the effectiveness of timing adjustment for mitigating the clock mismatch problem. In FIG. 8(*a*) there is a clock mismatch of +32 ppm and in FIG. 8(*b*) there is a clock mismatch of −32 ppm. The dashed lines show the result without timing adjustment for comparison. In both exemplary cases, the delay is improved when the timing adjustment method described herein is used. FIG. 9 shows the simulation parameters used.

The operation of each of the network entities described above will now be summarized.

RAN Side: Operation of the Base Station (for Example, a gNB)

For DL SPS, the CMI is provided by the gNB (in the form of a transmission interval/periodicity according to the 5G system clock and/or the rate ratio described above) to the UE device. The CMI may be provided to the UE:

a. In SPS configuration RRC.

b. In another type of RRC signaling.

The proposed timing adjustment algorithm is then run. This may comprise the following steps: determining the timing adjustment parameter (for example, the high/low thresholds); calculating the timing adjustment factor; and executing the timing adjustment action.

The timing adjustment may be carried out as follows:

Reactive SPS/CG timing adjustment with PDCCH:

With the existing DCI format.

With another type of DCI format.

The timing adjusting DCI may be scrambled by the CS-RNTI which identifies the SPS/CG.

Proactive SPS/CG timing adjustment with RRC signaling:

With existing SPS configuration RRC.

With another type of SPS.

For UL CG, the CMI obtained from the UE is further provided to the UPF in the core network. This may be provided via another core network component, for example a Session Management Function (SMF) component.

The gNB may also measure the CMI and jitter of the data flow from the core network, as well as hold and forward the periodical data burst from the core network for removing the jitter.

The gNB may therefore be configured to provide the timing adjustment command to the UE with DCI format or RRC signalling. For UL CG, the gNB may to be configured to provide the CMI obtained from the UE further to the UPF in the core network. This may be provided via another core network component, such as a SMF component. For reactive timing adjustment, the gNB may decide whether to adjust the timing of the transmission of next packet and indicate that in DCI. This may be done using a new type of DCI which contains at least the information of time domain resource for the adjusted next transmission. For proactive timing adjustment, the gNB may calculate the number of CG/SPS periods in the future at when the timing adjustment should take place and indicate that in RRC message. This may be done using a new type of RRC which contains at least the information of time domain resource for the adjusted transmission in the future.

UE Device Side

For UL CG, the UE is configured to measure the CMI from the external network node or end station.

For UL CG, the UE device provides the CMI to the gNB (for example, in MAC CE).

For UL CG, the UE device provides the holding time of the data burst at the UE to the gNB (for example, with the MAC CE or attached to data burst). The holding time can be quantized for reducing UL overhead.

For UL CG, the timing of the CG transmission is adjusted according to the gNB's timing adjustment command (PDCCH/DCI or RRC signaling).

For DL SPS, the data burst is egressed according to the CMI provided to the UE device by the gNB.

The UE may therefore measure the CMI from an external network node and provide the CMI to the gNB, provide the holding time to the gNB, and adjust the transmission timing in UL CG according to the timing adjustment command from the gNB.

The Core Network (or Component Thereof)

For DL SPS, the core network (for example a UPF) measures the CMI from the external network node or end station.

The measured CMI is provided from the core network to the gNB. For example, the CMI, such as the rate ratio, may be added to the Time Sensitive Communication Assistant Information (TSCAI).

For UL CG traffic, the data burst is egressed according to the CMI provided by the gNB.

The core network may therefore measure the CMI from an external network node and provide the CMI to the gNB. This may be provided via another core network component, such as a SMF component. For UL CG, the core network may egress the data burst according to the CMI provided by the gNB.

In the summary described above, the specific term UE device may be replaced by any suitable communication terminal or UE device, the specific term gNB may be replaced by any suitable base station, access node or network node, and the specific term core network (or a specific component thereof, such as the UPF) may be replaced by any suitable network node.

Using the method described herein, the timing of the outgoing data flow is able to be adjusted in order to mitigate mismatch between the clocks of different domains.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects may consist of any such individual feature or combination of features. In view of the foregoing description it will be evident to a person skilled in the art that various modifications may be made within the scope of the invention.

What is claimed is:

1. A communication terminal for supporting a periodical data flow by forwarding messages received from a communication network to an external node not synchronized with the communication network, the communication terminal comprising:

processing circuitry configured to:
    obtain one or more timing adjustment indications provided by an access node of the communication network, the one or more timing adjustment indications being based on (i) clock mismatch information between the communication terminal and the external node and (ii) a holding time; and
    adjust transmission and/or reception timing of the periodical data flow in dependence on the one or more timing adjustment indications.

2. The communication terminal as claimed in claim 1, wherein the processing circuitry is further configured to:
    estimate the clock mismatch information between the communication terminal and the external node; and
    provide the estimated clock mismatch information and the holding time to the access node of the communication network.

3. The communication terminal as claimed in claim 2, wherein the estimated clock mismatch information is based on one of:
    (i) a periodicity with which messages of the periodical data flow are transmitted and/or received by the communication network according to a frequency of an internal clock of the communication network; and
    (ii) a ratio of a frequency of a clock of the external node and the frequency of the internal clock of the communication network.

4. The communication terminal as claimed in claim 1, wherein the processing circuitry is further configured to obtain estimated clock mismatch information from the access node and adjust egress transmission timing of the periodic data flow so as to mitigate a mismatch between a clock of the communication network and a clock of the external node.

5. The communication terminal as claimed in claim 1, wherein the processing circuitry is further configured to quantize the holding time and report the holding time to the access node.

6. The communication terminal as claimed in claim 1, wherein the communication terminal is a user equipment device and wherein the access node is a node B.

7. The communication terminal as claimed in claim 4, wherein the estimated clock mismatch information is based on one of:
    (i) a periodicity with which messages of the periodical data flow are transmitted and/or received by the communication network according to a frequency of an internal clock of the communication network; and
    (ii) a ratio of a frequency of a clock of the external node and the frequency of the internal clock of the communication network.

* * * * *